US010481917B2

(12) United States Patent
Choi et al.

(10) Patent No.: US 10,481,917 B2
(45) Date of Patent: Nov. 19, 2019

(54) METHOD AND APPARATUS FOR HIBERNATION OPERATION IN MULTIPLE OPERATING SYSTEM ENVIRONMENTS

(71) Applicant: SAMSUNG ELECTRONICS CO., LTD., Suwon-si, Gyeonggi-do (KR)

(72) Inventors: Hoon Choi, Suwon-si (KR); Eunwoo Park, Seoul (KR); Junghun Park, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 225 days.

(21) Appl. No.: 15/371,524

(22) Filed: Dec. 7, 2016

(65) Prior Publication Data

US 2017/0212793 A1    Jul. 27, 2017

(30) Foreign Application Priority Data

Jan. 26, 2016    (KR) .......................... 10-2016-0009405

(51) Int. Cl.
*G06F 9/44* (2018.01)
*G06F 9/4401* (2018.01)
*G06F 9/46* (2006.01)

(52) U.S. Cl.
CPC ............ *G06F 9/441* (2013.01); *G06F 9/4418* (2013.01); *G06F 9/461* (2013.01)

(58) Field of Classification Search
None
See application file for complete search history.

(56) References Cited

U.S. PATENT DOCUMENTS

| | | | |
|---|---|---|---|
| 6,049,884 A | 4/2000 | Tsuji | |
| 2001/0022536 A1* | 9/2001 | Kallio | H03L 1/00 331/1 R |
| 2003/0122524 A1* | 7/2003 | Rhee | H02J 7/0063 320/128 |
| 2004/0107359 A1* | 6/2004 | Kawano | G06F 9/441 726/26 |

(Continued)

FOREIGN PATENT DOCUMENTS

| | | |
|---|---|---|
| JP | 11-3151 | 1/1999 |
| KR | 10-2009-0107522 | 10/2009 |

OTHER PUBLICATIONS

[Online] "How to Put Your Apple Watch in Power Reserve Mode [VIDEO]", http://www.iclarified.com/48845/how-to-put-your-apple-watch-in-power-reserve-mode-video, downloaded Sep. 9, 2016, 7 pages, (Continued)

*Primary Examiner* — Tuan C Dao
(74) *Attorney, Agent, or Firm* — Nixon & Vanderhye P.C.

(57) ABSTRACT

Various embodiments include a first memory configured to store a first operating system and a second operating system; a second memory; and a processor, wherein the processor is configured to: check situation information associated with the electronic device based on execution of the first operating system in the second memory; when the situation information satisfies a predetermined condition, store, in the first memory, as a snapshot image, data associated with the execution of the first operating system and stored in the second memory; and execute the second operating system in the second memory.

18 Claims, 11 Drawing Sheets

(56) References Cited

U.S. PATENT DOCUMENTS

| | | | |
|---|---|---|---|
| 2005/0273663 A1* | 12/2005 | Yoon | G06F 1/3203 |
| | | | 714/36 |
| 2007/0280630 A1* | 12/2007 | Komoda | H04N 5/772 |
| | | | 386/277 |
| 2008/0162918 A1 | 7/2008 | Muurinen et al. | |
| 2008/0313451 A1* | 12/2008 | Yu | G06F 11/1417 |
| | | | 713/2 |
| 2010/0225640 A1* | 9/2010 | Vieri | G06F 1/3218 |
| | | | 345/214 |
| 2013/0151840 A1* | 6/2013 | Kanigicherla | G06F 9/461 |
| | | | 713/100 |
| 2014/0032810 A1* | 1/2014 | Kanigicherla | G06F 9/4843 |
| | | | 710/314 |
| 2015/0113257 A1* | 4/2015 | Lewis | G06F 9/4806 |
| | | | 713/1 |
| 2015/0193239 A1* | 7/2015 | Dolph | G06F 1/3212 |
| | | | 713/100 |
| 2015/0220131 A1 | 8/2015 | Johansson et al. | |
| 2015/0227183 A1 | 8/2015 | Carroll | |
| 2017/0168555 A1* | 6/2017 | Munoz | G06F 1/3228 |

OTHER PUBLICATIONS

[Online] "Check your battery and charge your Apple Watch", https://support.apple.com/en-us/HT204525, 2 pages.

* cited by examiner

METHOD AND APPARATUS FOR HIBERNATION OPERATION IN MULTIPLE OPERATING SYSTEM ENVIRONMENTS

CROSS-REFERENCE TO RELATED APPLICATION

This application is based on and claims priority under 35 U.S.C. § 119 to Korean Application Serial No. 10-2016-0009405, which was filed in the Korean Intellectual Property Office on Jan. 26, 2016, the disclosure of which is incorporated by reference herein in its entirety.

TECHNICAL FIELD

The present disclosure relates generally to a method and apparatus for a hibernation operation in multiple operating system environments.

BACKGROUND

Recently, with the development of a digital technology, various types of electronic devices such as a mobile communication terminal, Personal Digital Assistant (PDA), an electronic scheduler, a smart phone, a tablet Personal Computer (PC), a wearable device, etc. have been widely used. The electronic device has various functions such as a voice call, message transmission like a Short Message Service (SMS)/Multimedia Message Service (MMS), a video call, electronic organizer, photography, email transmission/reception, broadcast reproduction, Internet, music reproduction, schedule management, Social Networking Service (SNS), messenger, dictionary, game, and the like.

The electronic device uses a battery for portability. The electronic device requires battery charging, and the electronic device performs various functions resulting in an increase in the battery consumption thereof.

In order to reduce battery consumption, the electronic device may separately operate in a general operation mode and a low power operation mode. For example, a low-power operation mode is to save the battery consumption by restricting the use of functions other than must-have functions when the battery's state of charge is very low.

In addition, an electronic device such as a smart watch may operate in an ultra low-power mode by activating only minimum functions (e.g., a clock screen) such as a display and the like. The ultra low-power mode may also be similar to the low-power mode. However, when the ultra-low-power mode is switched to the general operation mode again, there is a problem in that the electronic device is booted from the beginning (e.g., cold booting) similar to a case where the power of the electronic device is switched on. In this case, the electronic device has disadvantages in that it takes a long time to boot up and it becomes an initialized state (e.g., an idle state) rather than being recovered to a conventional state.

SUMMARY

Various example embodiments may provide a method and apparatus for saving the battery life of the electronic device by allowing the least and/or reduced amount of operations when a first operating system switches to a second operating system.

An electronic device according to various example embodiments may include a first memory storing a first operating system and a second operating system; a second memory; and a processor, wherein the processor is configured to: check situation information associated with the electronic device based on the execution of the first operating system in the second memory; when the situation information satisfies a predetermined condition, store, in the first memory, as a snapshot image, data associated with the execution of the first operating system and stored in the second memory; and execute the second operating system in the second memory.

A method of operating an electronic device according to various example embodiments may include: checking situation information associated with the electronic device at least partially based on the execution of the first operating system; when the situation information satisfies a predetermined condition, storing, in the first memory, as a snapshot image, data associated with the execution of the first operating system and stored in the second memory; and executing the second operating system in the second memory.

According to various example embodiments, when a first operating system switches to a second operating system, the least and/or reduced amount of operations may be allowed to save the battery life of the electronic device.

According to various example embodiments, when a second operating system switches to a first operating system, the electronic device may be recovered to a state corresponding to a time point before an operation of switching to the second operating system was performed.

According to various example embodiments, the boot time can be reduced by recovering to the state of the electronic device previously stored in the memory.

According to various example embodiments, the boot time can be minimized and/or reduced to improve the usability of the electronic device.

BRIEF DESCRIPTION OF THE DRAWINGS

The above and other aspects, features, and advantages of the present disclosure will be more apparent from the following detailed description, taken in conjunction with the accompanying drawings, in which like reference numerals refer to like elements, and wherein.

DETAILED DESCRIPTION

Figure 1:
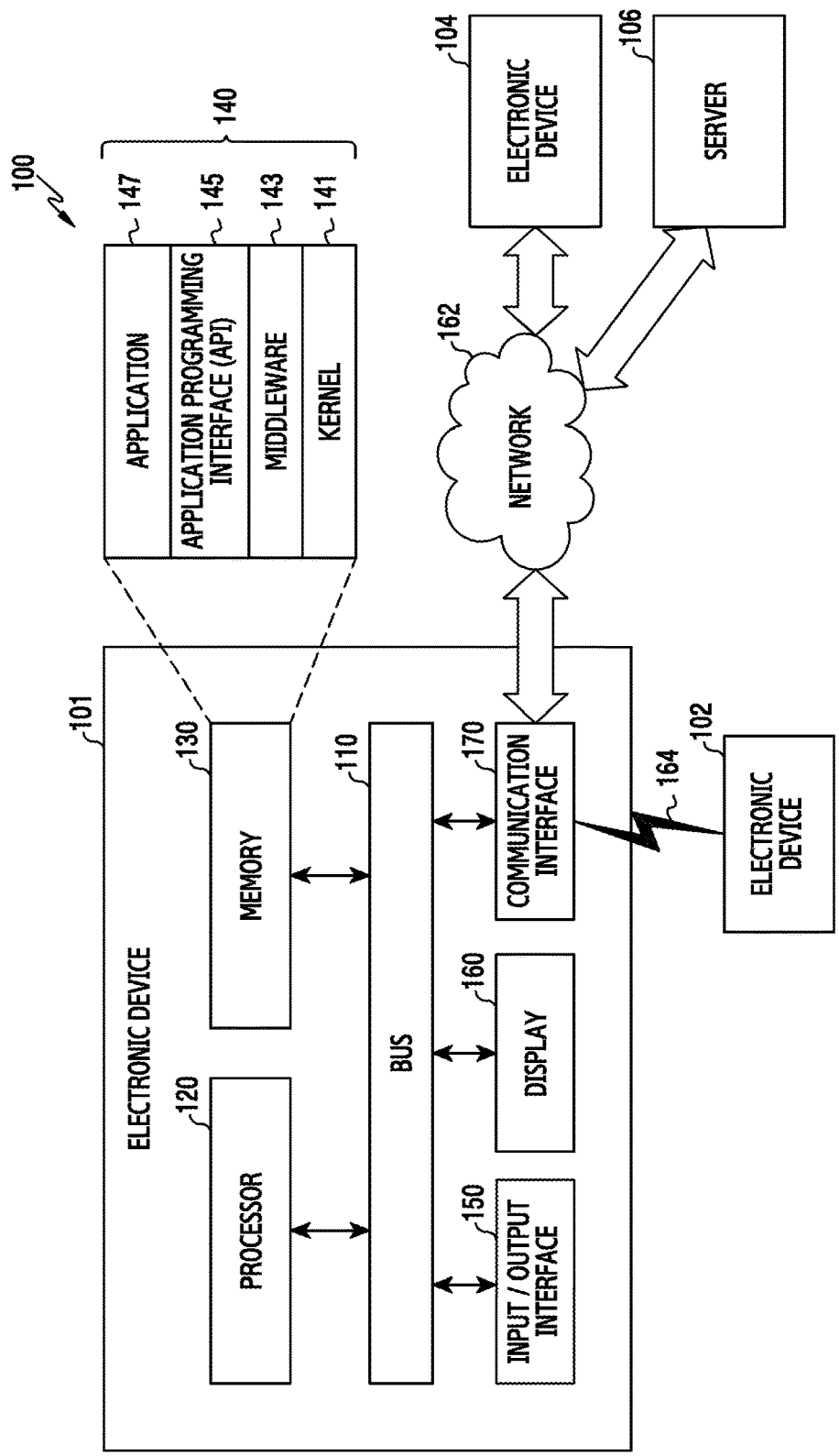
FIG. 1 is a diagram illustrating an example electronic device within a network environment according to various example embodiments.

Hereinafter, various example embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B. The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may refer, for example, to a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a diagram illustrating an example network environment including an electronic device according to various example embodiments of the present disclosure.

An electronic device 101 within a network environment 100, according to various embodiments, will be described with reference to FIG. 1. The electronic device 101 may include a bus 110, a processor 120, a memory 130, an input/output interface (e.g., including input/output circuitry) 150, a display 160, and a communication interface (e.g., including communication circuitry) 170. According to an embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include one or more of a Central Processing Unit (CPU), an Application Processor (AP), and a Communication Processor (CP). The processor 120 may carry out, for example, calculation or data processing relating to control and/or communication of at least one other component of the electronic device 101.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may include various circuitry configured to function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a Micro-ElectroMechanical Systems (MEMS) display, and an electronic paper display, or the like, but is not limited thereto. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may include various communication circuitry configured to establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106). The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short range communication 164. The short-range communication 164 may include at least one of, for example, Wi-Fi, Bluetooth, Near Field Communication (NFC), and Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to various embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
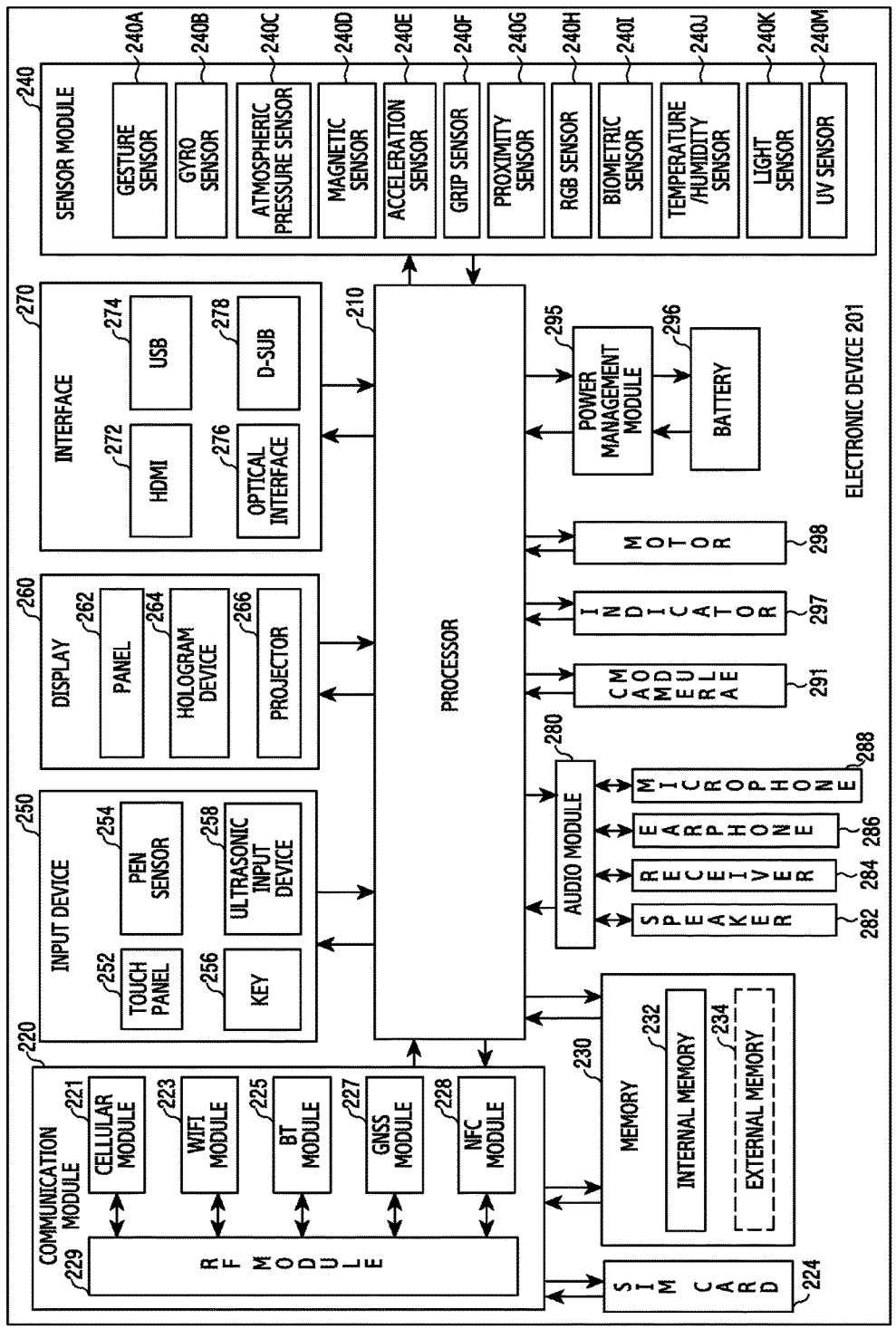
FIG. 2 is a block diagram illustrating an example configuration of the electronic device according to various example embodiments.

FIG. 2 is a block diagram illustrating an example electronic device according to various example embodiments of the present disclosure.

The electronic device 201 may include, for example, all or a part of the electronic device 101 illustrated in FIG. 1. The electronic device 201 may include one or more processors 210 (e.g., Application Processors (AP)), a communication module (e.g., including communication circuitry) 220, a subscriber information module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (e.g., a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include, various communication circuitry, such as, for example, and without limitation, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using a subscriber identification module (e.g: SIM card) 224 (e.g., the SIM card). According to an embodiment of the present disclosure, the cellular module 221 may perform at least some of the functions that the AP 210 may provide. According to an embodiment of the present disclosure, the cellular module 221 may include a communication processor (CP).

For example, each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G a color sensor 240H (e.g., red, green, and blue (RGB) sensor), a biometric sensor (medical sensor) 240I, a temperature/humidity sensor 240J, an illuminance (e.g., light) sensor 240K, and a Ultra Violet (UV) sensor 240M. Additionally or alternatively, the sensor module 240 may include, for example, an E-nose sensor, an electromyography (EMG)

sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device which may photograph a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
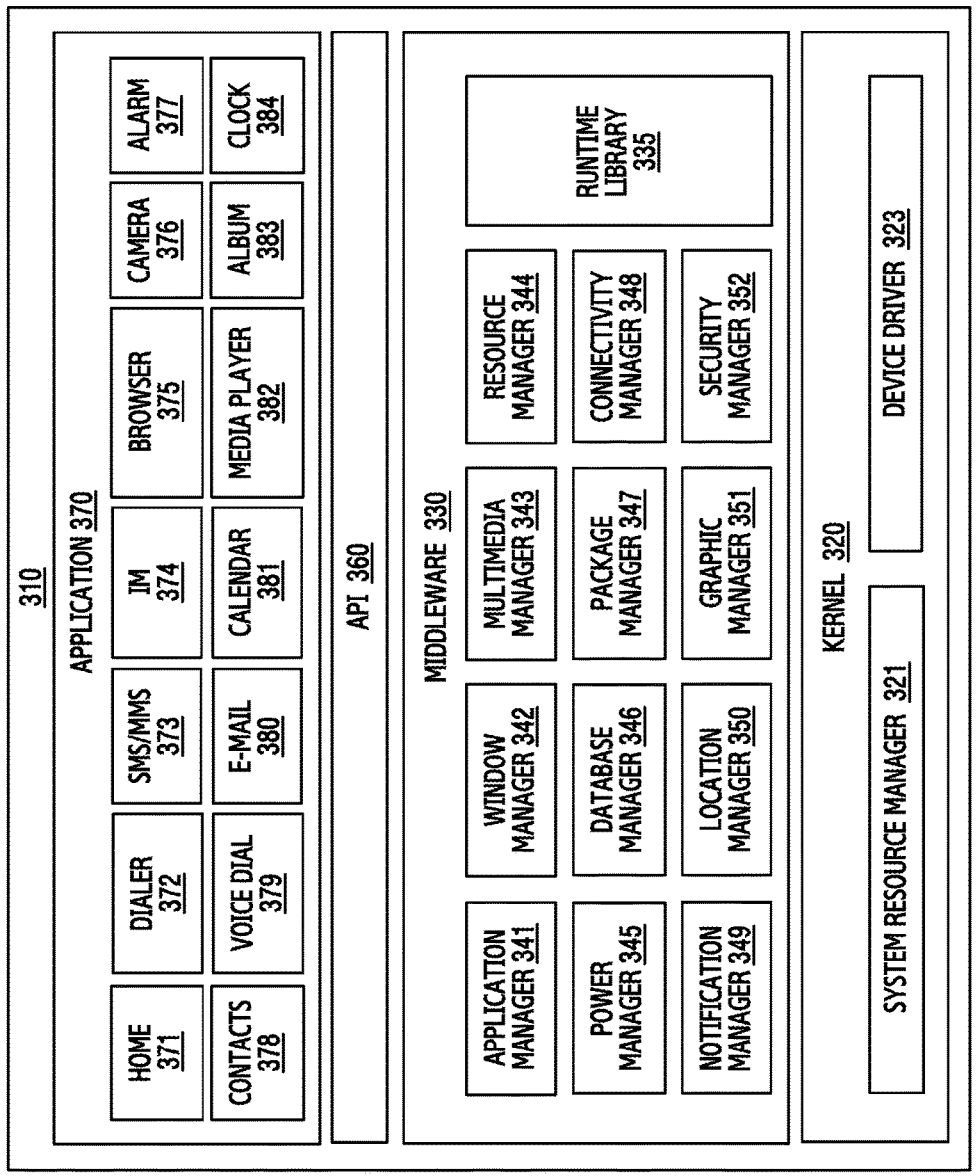
FIG. 3 is a block diagram illustrating an example program module according to various example embodiments.

FIG. 3 is a block diagram illustrating an example program module according to various example embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android™, iOS™, Windows™, Symbian™, Tizen™, Bada™, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, contacts 378, a voice dial 379, an email 380, a calendar 381, a media player 382, an album 383, a clock 384, health care (e.g., measuring exercise quantity or blood sugar), or environment information (e.g., providing atmospheric pressure, humidity, or temperature information).

According to an embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance or the like) designated according to an external electronic device (e.g., attributes of the electronic device 102 or 104). According to an embodiment of the present disclosure, the applications 370 may include an application received from an external electronic device (e.g., the server 106, or the electronic device 102 or 104). According to an embodiment of the present disclosure, the applications 370 may include a preloaded application or a third party application that may be downloaded from a server. The names of the components of the program module 310 of the illustrated embodiment of the present disclosure may change according to the type of operating system.

According to various embodiments, at least a part of the programming module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, refer to a unit including one of hardware (e.g., circuitry), software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of processing circuitry, an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (e.g., modules or functions thereof) or the method (e.g., operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable recoding media may be, for example, the memory 130.

Figure 4:
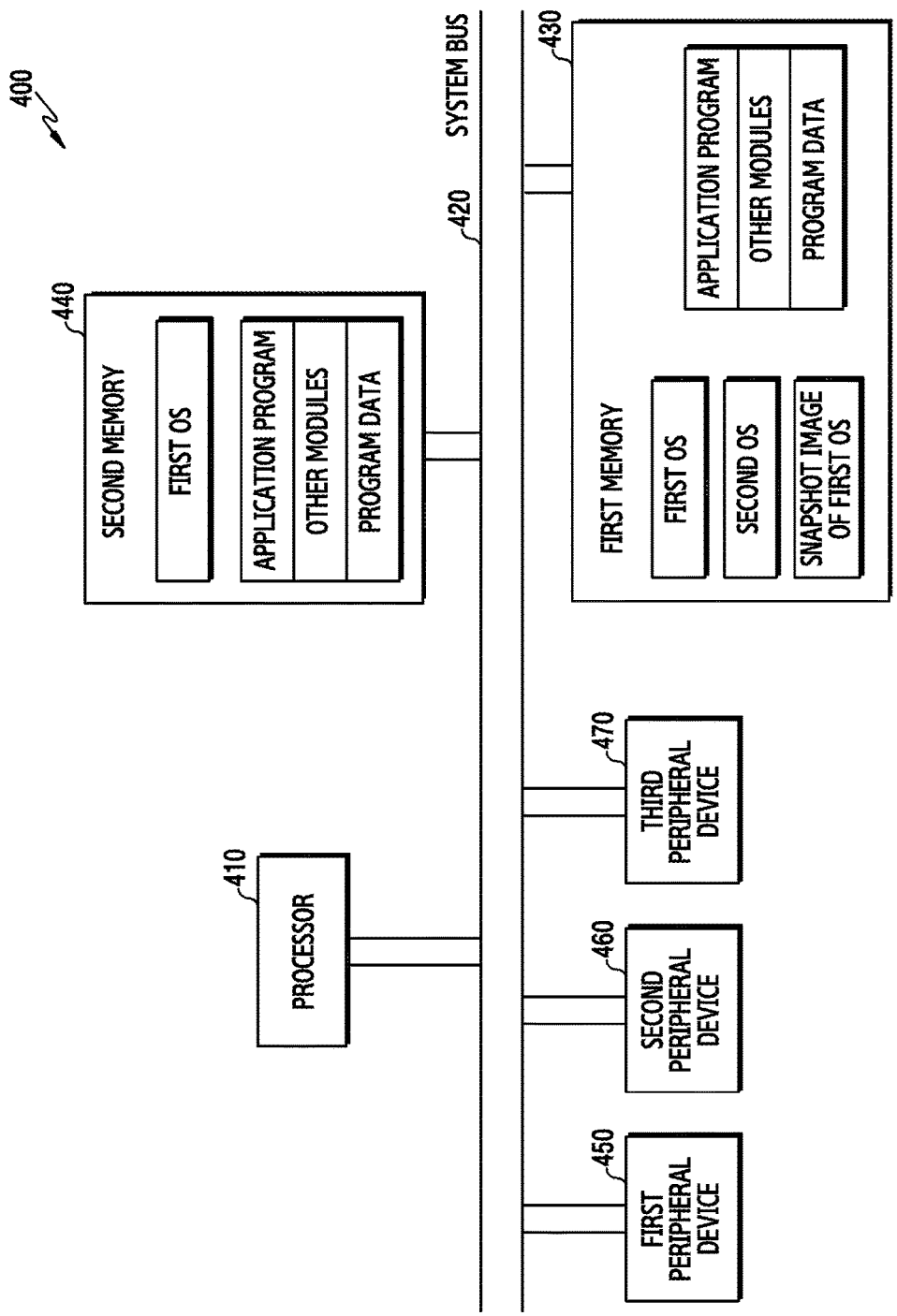
FIG. 4 is a block diagram illustrating an example configuration of the electronic device according to various example embodiments.

FIG. 4 is a block diagram illustrating an example configuration of the electronic device according to various example embodiments.

Referring to FIG. 4, the electronic device 400 (e.g., the electronic device 101 and the electronic device 201) may include a processor 410, a system bus 420, a first memory 430, second memory 440, a first peripheral device 450, a second peripheral device 460, and a third peripheral device 470. The electronic device 400 may omit at least one element, or may additionally include other elements.

The system bus 420 may include a circuit for connecting elements 410 and 430 to 470 with each other and transferring communication (e.g., control messages and/or data) between the elements. The system bus 420 may be, for example, the bus 110 of FIG. 1.

The processor 410 may include one or more of a Central Processing Unit (CPU), an Application Processor (AP), and a Communication Processor (CP). The processor 410, for example, may perform operations or data processing relating to the control and/or communication of at least one other element of the electronic device 400. The processor 410 may be the processor 120 of FIG. 1 or the processor 210 or FIG. 2.

According to various embodiments, the first memory 430 may store commands or data relating to one or more other elements of the electronic device 400. For example, the first memory 430 may store information on an application program relating to a first operating system (e.g., a first OS) and a second operating system (e.g., a second OS), other modules, and program data. The first memory 430 may copy data which is stored in the second memory 440 as a snapshot image (or a hibernation image), while the first OS is being driven and store the same. According to an embodiment, the first memory 430 may store software and/or a program. The program may include, for example, a kernel, middleware, and application programming interface (API), and/or an application program (or 'application'), and the like. According to various embodiments, the first memory 430 may include a non-volatile memory (e.g., Read Only Memory (ROM) and flash memory). For example, the first memory 430 may be a storage memory, and may refer to a device for performing a function of storing information required by the electronic device 101, a result obtained by the processing of data by the electronic device 101, and the like.

According to various embodiments, the second memory 440 may store programs and data currently being executed. The second memory 440 may be a main memory, and may refer to a device for temporarily storing programs currently being executed in the electronic device 101 and data needed by the programs. The processor 210 may load, to the second memory 440, commands or data received from at least one of other elements (e.g., the first memory 430) and process the same, and store data as a result of the processing in the first memory 430.

For example, the second memory 440 may store commands or data relating to the at least one different elements of the electronic device 400 while the first operating system (e.g., a first OS) is being driven. For example, the second memory 440 may store information on application programs associated with the first operating system, other modules, and program data. According to various embodiments, the second memory 440 may include a volatile memory (e.g., Dynamic Random Access Memory (DRAM) or Static Random Access memory (SRAM)) or a non-volatile memory (e.g., a Magnetic Random Access Memory (MRAM) and Phase-change Memory (PRAM)).

The first peripheral device 450, the second peripheral device 460, and the third peripheral device 470 may be devices wired or wirelessly connected to built-in devices of the electronic device 400 or to the electronic device 400. The first peripheral device 450, the second peripheral device 460, and the third peripheral device 470 may be activated or deactivated according to an operating system being driven in the electronic device 400. Here, 'activation' may for example, refer to a situation in which power is applied to the peripheral device and used therein. The 'deactivation' may refer, for example, to a situation in which power is not applied to the peripheral device and not being used therein.

According to various embodiments, the electronic device 400 may be divided into a mode (e.g., a general mode) in which the first OS operates and a mode (e.g., a power save mode) in which the second OS operates. In the electronic device 400, an application being operated may switch according to the mode, the mode of the operating system being operated may be changed, or a different operating system may be newly driven. Alternatively, each chip of the electronic device 400 may be deactivated at a chip level of each built-in module, or an operation mode of each chip may be different.

For example, the electronic device 400 may perform a cold boot for initializing all of the devices and settings, as in turning on the power. In addition, the electronic device 400 may perform a warm boot for rapidly switching from a sleep state where DRAM is in an activated state to a normal state. In addition, the electronic device 400 may record contents stored in the main memory (e.g., the second memory 440), by applying hibernation, in a non-volatile storage device (e.g., the first memory 430) such as a hard disk. Accordingly, the electronic device 400 may perform a rapid boot using hibernation, however the boot using the hibernation may not correspond to the warm boot.

The first operating system may be a general driving mode which can be driven when the battery condition of the electronic device 400 is good, may support a platform and drive various applications, and may be a mode in which most pieces of built-in hardware of the electronic device 400 can be used. The platform may refer to an operating system based on a specific processor model mainly configuring a computer system and a single computer system. For example, a DOS that operates on MS-DOS may be a platform, and MS-Windows may be a platform for application software that operates on the MS-Windows. Alternatively, an environment provided by any software may be referred to as a platform. For example, an environment provided by MS-Windows may be the platform of MS-Windows. The first operating system may include, for example, a multitasking kernel operating system (OS) such as Linux, Unix, Windows, etc., and a platform OS operating thereon, such as Android, Tizen, Window platform, etc. For example, the first operating system may drive all of the first peripheral device 450, the second peripheral device 460, and the third peripheral device 470.

The second operating system may be a low power mode which can be driven when the battery condition of the electronic device 400 is not good, and may be a mode for performing the minimum and/or reduced functions according to the purpose (or characteristics) of the electronic device 400. For example, a restricted application can be driven in the second operating system, and limited hardware can be used among built-in hardware of the electronic device 400. For example, the second operating system is a small-scale operating system, and may be a Real-Time Operating System (RTOS) or a boot loader. For example, when the second operating system is being driven, the electronic device 400 may drive the display in a low power mode, drive a power key, display a clock screen, and activate some areas of the memory.

According to various embodiments, the second operating system may deactivate at least one of the first peripheral device 450, the second peripheral device 460, and the third peripheral device 470. That is, the second operating system may drive only the first peripheral device 450, and may stop the driving of the second peripheral device 460 and third peripheral device 470. Alternatively, the second operating system 460 may maintain only a specified (or predetermined) clock frequency and a power level of the second peripheral device 460, and may stop the driving of the third peripheral device 470. The second operating system may control whether to control the first peripheral device 450, the second peripheral device 460, and third peripheral device 470, a power level thereof, and the like based on a value specified for each peripheral device.

For example, the second operating system may provide different functions according to the purpose or characteristics of the electronic device 400. For example, a wearable device such as a watch may have only a clock function provided by the second operating system. Alternatively, a wearable device such as a healthcare band may have a function of sensing an amount of exercise, provided by the second operating system.

According to various embodiments, software used as a boot loader in the first operating system may be used in the second operating system. In general, the boot loader software is a program that is executed prior to an operating system, and the boot loader performs a task required to properly boot up the electronic device 400, serves to load the operating system, and then completes the procedure. Hereinafter, an embodiment will be described where the boot loader software itself functions as the second operating system for driving a low-power mode of the electronic device 400. However, although the second operating system is described as a boot loader, other program or operating systems for performing functions and roles corresponding to the boot loader may be the second operating system.

An electronic device according to various embodiments includes a first memory storing a first operating system and a second operating system, a second memory, and a processor, wherein the processor is configured to: check situation information associated with the electronic device based on the execution of the first operating system in the second memory; when the situation information satisfies a specified (or predetermined) condition, store, in the first memory, as a snapshot image, data associated with the execution of the first operating system and stored in the second memory; and execute the second operating system in the second memory.

In an embodiment, the processor may be configured to detect, as at least a part of the situation information, an input (e.g., without limitation, a user's input), a battery state, a power-off event, an input from an external electronic device, or a combination thereof.

The snapshot image may include execution state information of the first operating system.

In an embodiment, the processor may be configured to specify a clock frequency at which the processor operates to a predetermined clock frequency at least partially based on the execution of the second operating system.

In an embodiment, the electronic device may further include a display, and the processor may be configured to change at least a part of the configuration information relating to the display at least partially based on the execution of the second operating system.

In an embodiment, the processor may be configured to output notification information corresponding to at least one function through a display or a speaker functionally connected to the electronic device at least partially based on the execution of the second operating system in the second memory.

In an embodiment, the processor may be configured to output, as the notification information, time information, information received from an external electronic device through communication circuitry of a communication module functionally connected to the electronic device, information detected through a sensor module functionally connected to the electronic device, or a combination thereof.

In an embodiment, the electronic device may further include an input module comprising input circuitry, a sensor module comprising at least one sensor, or a communication module comprising communication circuitry, which are functionally connected to the processor, and the processor may be configured to transmit, to an external electronic device, information obtained through the input module or the sensor module, through the communication module at least partially based on the execution of the second operating system in the second memory.

In an embodiment, the processor may be configured to check whether the situation information satisfies another predetermined condition at least partially based on the execution of the second operating system, and re-execute the first operating system in the second memory using at least a part of the snapshot image at least partially based on the checking.

In an embodiment, the processor may be configured to load the snapshot image to the second memory, as at least some of the operations to be re-executed.

In an embodiment, the processor may be configured to recover the first operating system to an execution state corresponding to the snapshot image, as at least some of the operations to be re-executed.

The electronic device described below may be the electronic device 101 of FIG. 1 or the electronic device 201 of FIG. 2. However, for the convenience of explanation, the electronic device is described as the electronic device 101 of FIG. 1, but the electronic device is not limited to the description thereof.

Figure 5:
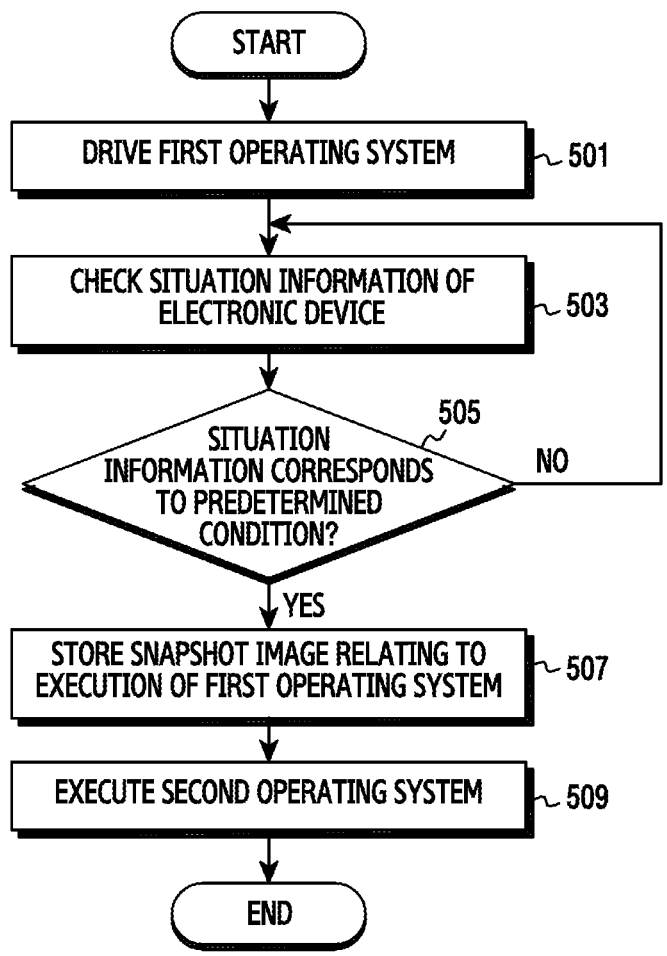
FIG. 5 is a flowchart illustrating an example method for operating an electronic device according to various example embodiments.

FIG. 5 is a flowchart illustrating an example method of operating an electronic device according to various example embodiments.

Referring to FIG. 5, in operation 501, the electronic device 101 (e.g., the processor 120) may drive a first operating system. The first operating system may be capable of performing a general operation of the electronic device 101. For example, the first operating system may include, for example, a multitasking kernel operating system (OS) such as Linux, Unix, Windows, etc., and a platform OS that operates thereon, such as Android, Tizen, Window platform, etc. General operations of the electronic device 101 may refer to processing all of the processes which can be performed in the electronic device 101.

In operation 503, the processor 120 may check situation information of the electronic device 101. The situation information may include, for example, one of the battery (e.g., battery 296) state and detection of a specified event of the electronic device 101. For example, the processor 120 may check whether the battery charging amount of the electronic device 101 is less than or equal to the reference value (e.g., 10%, 20%, etc.). The processor 120 may receive, as the detection of the specified event, an input for driving the second operating system, or may receive a power-off event from an external electronic device (e.g., the electronic devices 102 and 104) through the communication interface 170. At this time, the power-off event may be at least one of an input for powering off the electronic device 101, an input for driving the second operating system, or an input for saving the battery of the electronic device 101. For example, when the electronic device 101 is a watch type wearable device, the external electronic device may be a smart phone. Alternatively, the external electronic device may be a wearable device different from the electronic device 101.

In operation 505, the processor 120 may determine whether the situation information corresponds to a specified condition. For example, when the battery charging amount of the electronic device 101 is less than or equal to the reference value (e.g., 10%, 20%, etc.), the electronic device 101 may determine that the situation information corresponds to a specified condition. When the input for driving the second operating system is received from the user input, the processor 120 may determine that the situation information corresponds to a specified condition. When a power-off event is received from the external electronic device, the processor 120 may determine that the situation information corresponds to the specified condition.

The processor 120 may perform an operation 507 when the situation information corresponds to the specified condition, and may return to operation 503 when the situation information does not correspond to the specified condition.

In operation 507, the processor 120 may store the snapshot image (or a hibernation image) relating to the execution of the first operating system. The snapshot image may include execution state information of the first operating system. The execution state information of the first operating system may include a stack status of at least one application (or program) being executed on the electronic device 101. For example, the snapshot image may refer to data relating to the general operation processing in the processor 120 while the general operation is being performed. In the first operating system, the processor 120 stores data relating to the operation processing in the main memory (e.g., the second memory 440), and the snapshot image may be data stored in a volatile memory while the first operating system is being driven. The snapshot image may be used to rapidly recover the electronic device 101 to a time point before the second operating system was executed in the electronic device 101. The processor 120 may back up (or copy), to the first memory 430, data stored in the second memory 440 while the first operating system is being driven. That is, an operation of storing the snapshot image may be a hibernation operation.

When the storage of the snapshot image is completed, in operation 509, the processor 120 may execute a second operating system. The second operating system may be a low power driving mode (e.g., a power save mode), and may be a mode for performing the minimum and/or reduced function according to the purpose (or characteristics) of the electronic device 101. For example, a restricted application can be driven in the second operating system, and limited hardware can be used among built-in hardware of the electronic device 101. For example, the second operating system may be a very small-scale operating system, and may be a boot loader, or very small-scale operating system such as a Real-Time Operating System (RTOS) added to the boot loader.

Alternatively, the second operating system may be the same operating system as that of the first operating system but may have a different version therefrom. Alternatively, the second operating system may be a different operating system on equal level with the first operating system. In this case, the first operating system may be Windows, and the second operating system may be Linux. In addition, the boot loader may load the first operating system. When the boot loader is executed by the second operating system, the boot loader may execute a specific function within the boot loader, or may load a small-scale operating system (e.g., Real-Time Operating System (RTOS)).

When the storage of the snapshot image is completed, the processor 120 may reboot the system and drive the second operating system. For example, the processor 120 may re-reboot the system through a command for controlling a processor, such as a reboot command or a reset command. The processor 120 may not operate some hardware devices in order to drive only the minimum and/or reduced functions while the second operating system is being driven. For example, the processor 120 may drive a Bluetooth Low Energy (BLE) module while the second operating system is being driven.

According to an embodiment, when the processor reboots the system, the boot loader may be executed (the boot loader is loaded into memory by an initialization program). The boot loader may selectively perform a first role of loading the first operating system into the second memory 440 and a second role of performing an operation of the second operating system. The above selection may be done through the checking of a set value which will be described later in FIGS. 8 and 9.

According to various embodiments, the second operating system may provide different functions according to the purpose or characteristics of the electronic device 101. For example, if the electronic device 101 is a wearable device such as a watch, a clock function may be provided by the second operating system. Alternatively, if the electronic device 101 is a wearable device such as a healthcare band, a function of sensing an amount of exercise may be provided by the second operating system.

Figure 6:
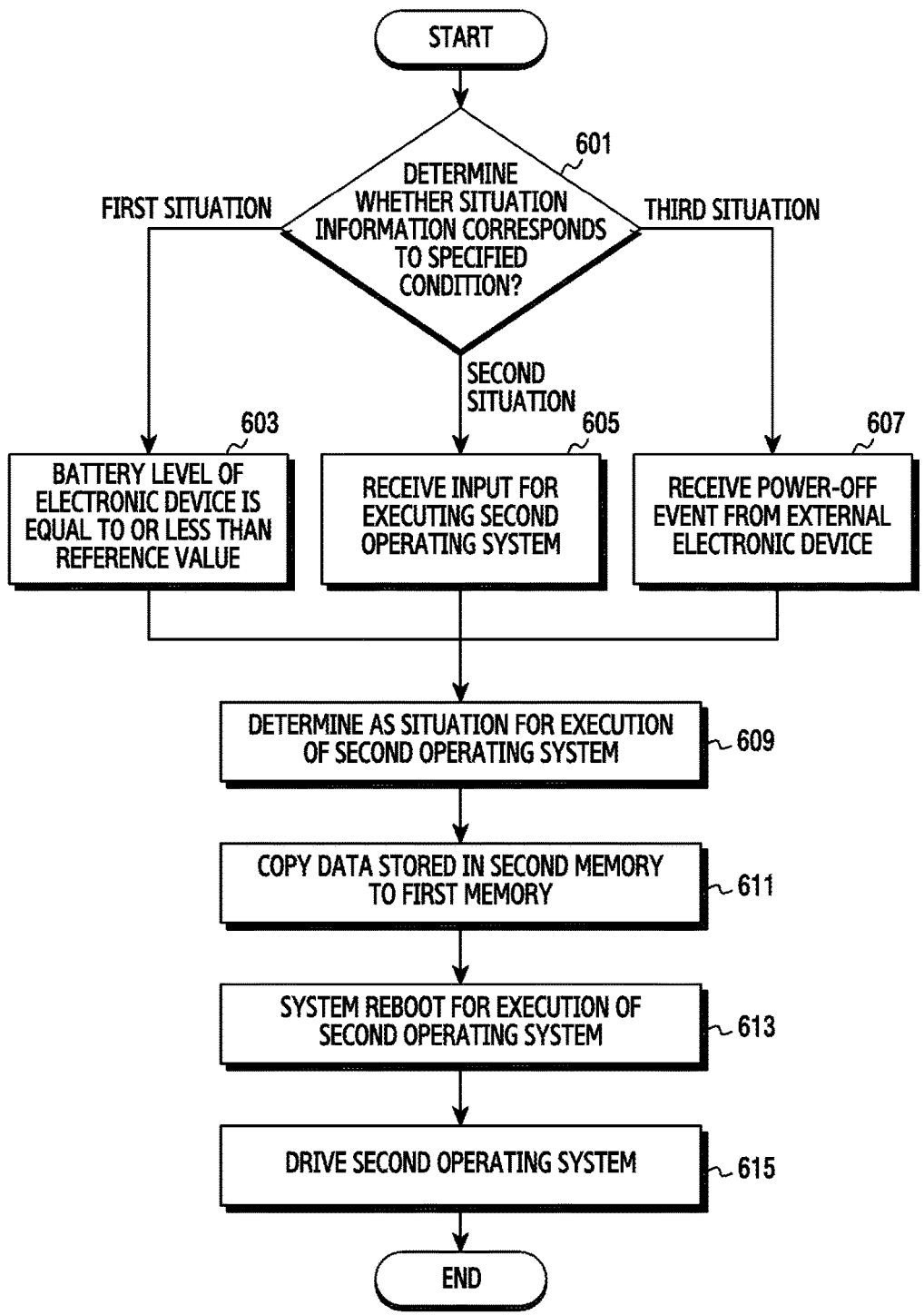
FIG. 6 is a flowchart illustrating an example method for controlling power of an electronic device according to various example embodiments.

FIG. 6 is a flowchart illustrating an example method for controlling power of an electronic device according to various example embodiments.

Referring to FIG. 6, in an operation 601, the electronic device 101 (e.g., the processor 120) may determine whether situation information of the electronic device 101 corresponds to a specified condition. The processor 120 may perform one of an operation 603, an operation 605, or an operation 607 according to the situation information. For example, the processor 120 may perform the operation 603 when the situation information of the electronic device 101 corresponds to first situation, may perform the operation 605 when the situation information of the electronic device 101 corresponds to second situation, and may perform the operation 607 when the situation information of the electronic device 101 corresponds to third situation.

In operation 603, the processor 120 may determine that the situation information of the electronic device 101 corresponds to a case where the battery level of the electronic device 101 is equal to or less than a reference value. In operation 605, the processor 120 may determine that the situation information of the electronic device 101 corresponds to a case where the user input for executing the second operating system is received. In operation 607, the processor 120 may determine that the situation information of the electronic device 101 corresponds to a case where a power-off event is received from the external electronic device.

In operation 609, the processor 120 may determine that the situation information of the electronic device 101 corresponds to a situation for executing the second operating system. The situation for executing the second operating system may be a case of saving power of the electronic device 101.

In operation 611, the processor 120 may copy, to the first memory 430, data stored in the second memory 440 in relation to the execution state of the first operating system. Here, the first memory 430 may be a non-volatile memory (e.g., ROM and flash memory), and the second memory 440 may be a volatile memory (e.g., DRAM and SRAM) or a non-volatile memory (e.g., MRAM and PRAM). In the first operating system, the processor 120 may store, in the second memory 440, data relating to the operation processing, and may copy the data stored in the second memory to the first memory 430. The copy operation is to rapidly recover the electronic device 101 to a time point before the second operating system was executed in the electronic device 101.

In operation 613, the processor 120 may perform a system reboot for executing the second operating system. The system reboot is to initialize the electronic device 101, and may be done for switching the operating system from the first operating system to the second operating system. When the system is rebooted, a boot loader may be executed.

In operation 615, the processor 120 may drive the second operating system. As described above, when the system is rebooted, the boot loader is executed, and the boot loader may load the second operating system. In another embodiment, the boot loader may be the second operating system. That is, it may be understood that the boot loader is omitted. According to various embodiments, a clock frequency at which the processor 120 operates may be changed to a specified clock frequency at least partially based on the execution of the second operating system. For example, the clock frequency while the second operating system is driven may be lower than a clock frequency while the first operating system is being driven. When the clock frequency is low, the processor 120 may reduce the power consumption. The processor 120 may drive the second operating system at a low clock frequency, so that the battery use of the electronic device 101 can be reduced.

According to various embodiments, the processor 120 may change a part of the configuration information relating to the display 160 at least partially based on the execution of the second operating system. The processor 120 may adjust the screen brightness or the screen color. For example, the screen brightness when the second operating system is driven may be lower than the screen brightness when the first operating system is driven. When the screen brightness is lowered, the processor 120 may reduce the power consumption. The processor 120 may set the screen color to colors when the first operating system is driven, and may set the screen color to black and white when the second operating system is driven. When the screen color is changed from color to black and white, the processor 120 may reduce the power consumption.

According to various embodiments, the processor 120 may output notification information corresponding to at least one function through the display 160 or speaker (e.g., the speaker 282) functionally connected to the electronic device 101 at least partially based on the execution of the second operating system in the second memory. For example, the notification information may be time information (e.g., clock information), information received from the external electronic device (e.g., the electronic devices 102 and 104) through the communication interface 170 functionally connected to the electronic device 101, information sensed through a sensor module (e.g., the sensor module 240) functionally connected to the electronic device 101, or a combination thereof. For example, the function within the boot loader is executed so that the clock information may be displayed on the display 160. In addition, the boot loader may process information collected from the sensor module and display the same on the display 160.

According to various embodiments, the processor 120 may transmit information acquired through the input/output interface 150 or the sensor module 240 to the external electronic device (e.g., the electronic devices 102 and 104) through the communication interface 170 at least partially based on the execution of the second operating system in the second memory. That is, the boot loader may transmit information collected from the sensor module 240 to the external electronic device. In this case, the boot loader may execute the communication interface 170 capable of communicating at a low power, such as a Bluetooth low power module, and may transmit the information to the external electronic device through the communication interface 170.

Figure 7C:
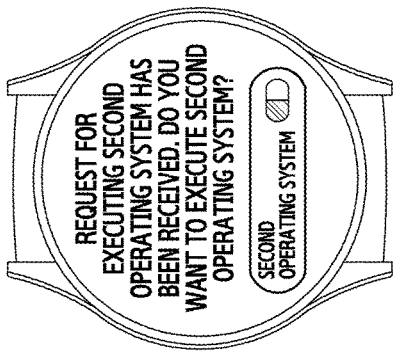
FIGS. 7A, 7B and 7C are diagrams illustrating an example of a user interface of an electronic device according to various example embodiments.
Figure 7B:
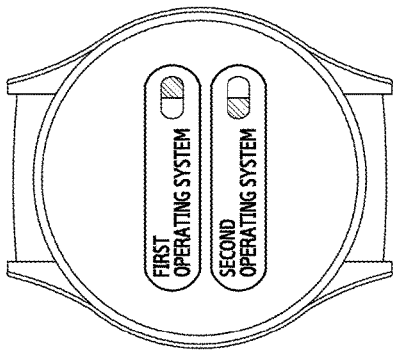
Figure 7A:
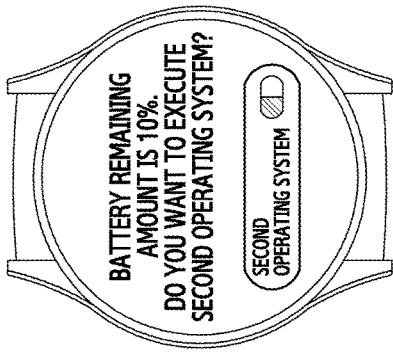

FIGS. 7A, 7B and 7C are diagrams illustrating an example of a user interface of an electronic device according to various example embodiments.

FIG. 7A illustrates a user interface displayed on the display 160 when the battery level of the electronic device 101 is equal to or less than a reference value. The processor 120 may notify of the low remaining battery amount of the electronic device 101 to the user, and allow the second operating system to be executed according to a user's selection. The user may enable or disable the second operating system by the user interface. The user interface of FIG. 7A may include notification information (The remaining battery amount is 10%. Do you want to execute the second operating system?), and the status bar of the second operating system may be set to 'inactive'. At this time, since the first operating system is executed when the battery level of the electronic device 101 is greater than the reference value, the status bar of the second operating system may be set to 'inactive'. When the user selects the status bar, the processor 120 may change the status bar from an inactive state (e.g., 'off') to an active state (e.g., 'on'). When the user does not select the status bar, the processor 120 may maintain the status bar in an inactive state (e.g., 'off').

According to various embodiments, the processor 120 may execute the second operating system according to the user's selection based on the configuration of the electronic device 101, or may execute the second operating system without the user's selection. For example, the processor 120 may execute the second operating system when a predetermined time has passed without the user's selection after the notification information is displayed. That is, when a predetermined time has passed after displaying the notification information, the user may set the electronic device 101 such that the status bar state is changed from an inactive state to an active state. In this case, the processor 120 may change the state of the status bar from an inactive state to an active state after a predetermined time has passed.

In FIG. 7A, although a battery 'reference value' of the electronic device 101 is described as 10%, the reference value may be set by a user or may be set in the electronic device 101 by default. Accordingly, the reference value may be 30% or 50%.

FIG. 7B illustrates a user interface that is displayed on the display 160 when an input, e.g., a user input, for the execution of the second operating system is received from the user. The user may make a request for the execution of the second operating system regardless of the state of the electronic device 101 or the battery state of the electronic device 101. For example, the processor 120 may enter into the configuration of the electronic device 101 according to a request by the user, and when the user selects an 'operating system menu', the processor 120 may display the user interface such as FIG. 7B. In the user interface of FIG. 7B, the first operating system may be set to 'active', and the second operating system may be set to 'inactive'. At this time, since the first operating system is being executed before the input of the user is received, the status bar of the first operating system may be set to 'active', and the status bar of the second operating system may be set to 'inactive'.

For example, when the user selects the status bar of the second operating system, the processor 120 may change the status bar of the first operating system from 'active' to 'inactive', and may change the status bar of the second operating system from 'inactive' to 'active'. Alternatively, when the user selects the status bar of the first operating system, the processor 120 may change the status bar of the first operating system from 'active' to 'inactive', and may change the status bar of the second operating system from 'inactive' to 'active'.

FIG. 7C illustrates a user interface that is displayed on the display 160 when a power-off event is received from an external electronic device. The external electronic device may be an electronic device that is functionally connected to the electronic device 101. For example, when the electronic device 101 is a wearable device, such as a watch, the external electronic device may be a smart phone. In this case, the external electronic device may be paired with the electronic device 101. The external electronic device may transmit the power-off event to the electronic device 101 in order to prevent the power consumption of the electronic device 101 based on the state of the electronic device 101 or an internal process thereof after being paired with the external electronic device. The user interface of FIG. 7C may include notification information on the power-off event (A request for executing the second operating system has been received. Do you want to execute the second operating system?), and may include a status bar set to 'inactive'. In this case, since the first operating system is being executed before the power-off event is received, the status bar of the second operating system may be set to 'inactive'. When the user selects the status bar, the processor 120 may change status bar from 'inactive' to 'active'. When the user does not select the status bar, the processor 120 may maintain the status bar in the inactive state.

Figure 8:
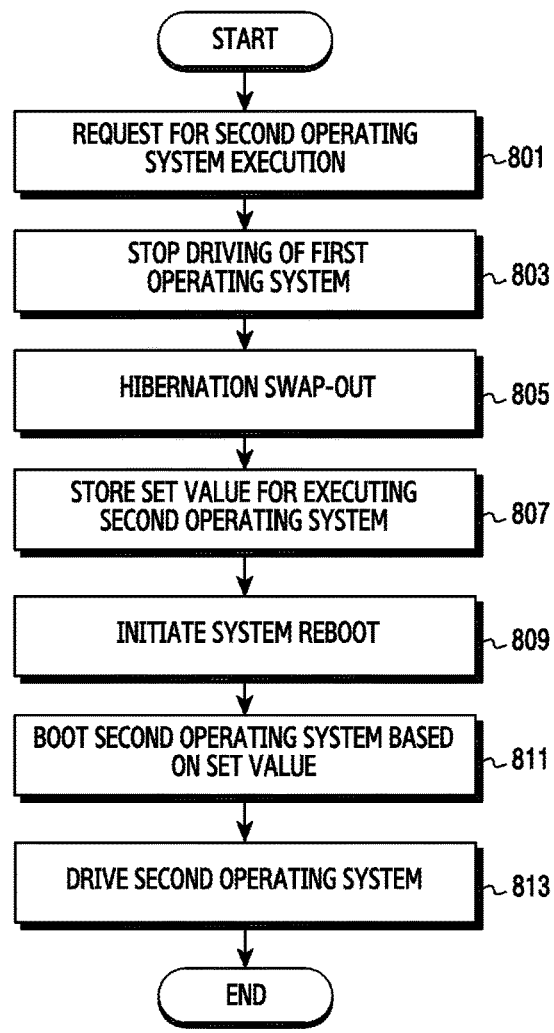
FIG. 8 is a flowchart illustrating an example method for driving a second operating system according to various example embodiments.

FIG. 8 is a flowchart illustrating an example method for driving a second operating system according to various example embodiments.

Referring to FIG. 8, in operation 801, the electronic device 101 (e.g., the processor 120) may receive a request for the execution of the second operating system. For example, when the battery level of the electronic device 101 is equal to or less than the reference, processor 120 may determine that the request for executing the second operating system is made. When a user input for executing the second operating system is received, the processor 120 may determine that the request for executing second operating system is made. When a power-off event is received from an external electronic device, the processor 120 may determine that the request for executing the second operating system is made.

In operation 803, the processor 120 may stop the driving of the first operating system. The stopping (freezing) of driving of the first operating system may control such that the first operating system is no longer driven. In an embodiment, the stopping of driving of the first operating system may refer, for example, to a situation in which the operating system is in a sleep state. In various embodiments, the processor 120 may stop all operations currently being driven in the electronic device 101. For example, when an application or data is downloaded to the electronic device 101, the processor 120 may stop the download. Alternatively, the processor 120 may stop the operation of the application currently being executed in the electronic device 101.

In operation 805, the processor 120 may perform an operation of a hibernation swap-out. The hibernation swap out refers to backing up, to the first memory 430 (e.g., a non-volatile memory), the second memory 440 (e.g., a volatile memory (e.g., RAM) or a nonvolatile memory (e.g., MRAM and PRAM) using a swap-out method by a kernel. Theoretically, all the contents of the second memory 440 currently being used in the electronic device 101 may be stored in the first memory 430.

In operation 807, the processor 120 may store a set value for executing the second operating system. For example, the processor 120 may store the set value for executing the second operating system in a specific area of the memory. The specific area may be a magic code. The magic code may be a space for recording an internal commitment for transmitting and receiving a message to and from a boot loader and a kernel or the boot loader. In embodiments, the operation 807 may be performed at different time points from operation 801 to operation 809.

In operation 809, the processor 120 may initiate a system reboot. The system reboot is to initialize the electronic device 101, and may be done for switching the operating system from the first operating system to the second operating system. When the system is rebooted, a boot loader may be executed.

In operation 811, the processor 120 may be booted by the second operating system based on the set value. When the set value is stored in the magic code, the processor 120 may be booted by the second operating system. Alternatively, when the set value is not stored in the magic code, the processor 120 may be booted by the first operating system. According to various embodiments, when the set value is stored as '1' in the magic code, the processor 120 may be booted by the second operating system, and when the set value is stored as "0" in the magic code, the processor 120 may be booted by the first operating system. As described above, when the system is rebooted, a boot loader is executed, and the boot loader may perform a booting of the first operating system or the second operating system (that is, an appropriate operating system program may be loaded into a second memory 440), on the basis of the set value. In an embodiment, the boot loader may perform a function of the second operating system as a function of the boot loader program itself without booting up a separate second operating system.

In operation 813, the processor 120 may drive the second operating system. According to various embodiments, a clock frequency at which the processor 120 operates may be changed to a specified clock frequency at least partially based on the execution of the second operating system. According to various embodiments, the processor 120 may change a part of the configuration information relating to the display 160 at least partially based on the execution of the second operating system. According to various embodiments, the processor 120 may output notification information corresponding to at least one function through the display 160 or speaker (e.g., speaker 282) functionally connected to the electronic device 101 at least partially based on the execution of the second operating system in the second memory 440. According to various embodiments, the processor 120 may transmit information acquired through the input/output interface 150 or the sensor module 240 to the external electronic device (e.g., the electronic devices 102 and 104) through the communication interface 170 at least partially based on the execution of the second operating system in the second memory 440.

Figure 9:
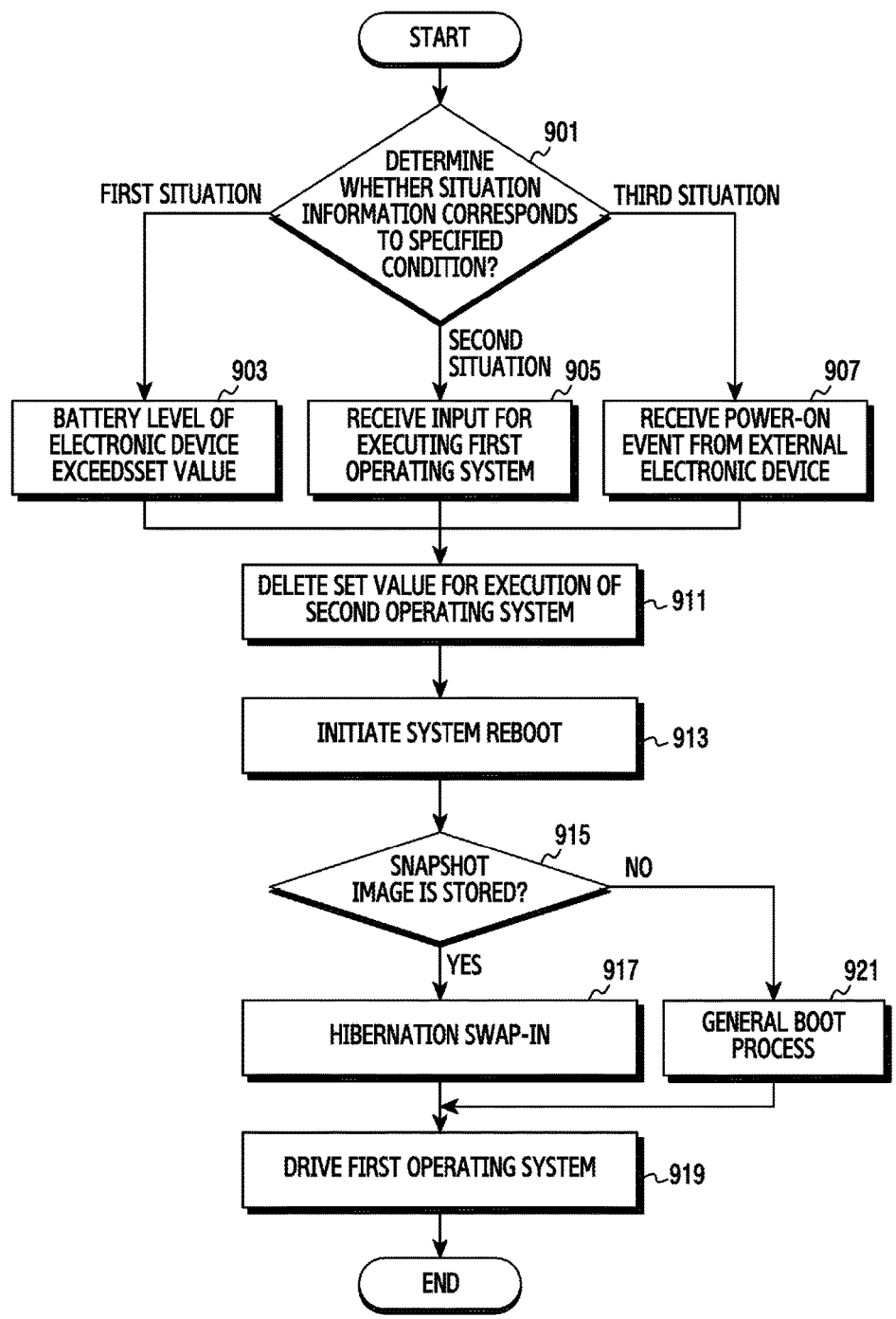
FIG. 9 is a flowchart illustrating an example method for driving a first operating system according to various example embodiments.

FIG. 9 is a flowchart illustrating an example method for driving a first operating system according to various example embodiments.

Referring to FIG. 9, in operation 901, the electronic device 101 (e.g., the processor 120) may determine situation information. The processor 120 may check whether situation information of the electronic device 101 satisfies other specified conditions at least partially based on the execution of the second operating system. The processor 120 may re-execute the first operating system at least partially based on the checking. The processor 120 may perform one of the operation 903, an operation 905, or an operation 907 according to the situation information. For example, the processor 120 may perform the operation 903 when the situation information of the electronic device 101 corresponds to a first situation, may perform the operation 905 when the situation information of the electronic device 101 corresponds to a second situation, and may perform the operation 907 when the situation information of the electronic device 101 corresponds to a third situation. However, the operation 901 may be omitted depending on an embodiment. For example, when the battery level of the electronic device 101 is greater than the set value, it is possible to perform the operation 903 without performing the operation 901.

In operation 903, the processor 120 may determine that the situation information of the electronic device 101 corresponds to a case where the battery level of the electronic device 101 exceeds the set value. Alternatively, the processor 120 may include, as the first situation, a case where a charger is connected to the electronic device 101. The set value may be set by the user or set in the electronic device 101 by default. For example, the set value may be the same as or different from the reference value described in FIGS. 5 to 8. The set value may be set higher than the reference value. The set value may be 30%, 50%, and 99%. The processor 120 may notify the user that the battery of the electronic device 101 has been charged, and may allow the first operating system to be executed. The user interface may be similar to that illustrated in FIG. 7A.

The user interface of FIG. 7A may include notification information (e.g., "The battery is charged to more than 30%. Do you want to execute the first operating system?"), and the status bar of the first operating system may be set to 'inactive'. In this case, since the second operating system is being executed in the electronic device 101, the status bar of the first operating system may be set to 'inactive'. When the user selects the status bar, the processor 120 may change the status bar from an inactive state to an active state. When the user does not select the status bar, the processor 120 may maintain the status bar in the inactive state.

In operation 905, the processor 120 may determine that the situation information of the electronic device 101 corresponds to a case where an input, e.g., a user input, for executing the first operating system is received. The user may make a request for the execution of the first operating system regardless of the state of the electronic device 101 or the battery state of the electronic device 101. The processor 120 may enter into the setting of the electronic device 101 according to the request by the user, and when the user selects an 'operating system menu', the processor 120 may display a user interface that activates the first operating system. The user interface may be similar to that illustrated in FIG. 7B. At this time, the user interface may set the status bar of the first operating system to 'inactive', and set the status bar of the second operating system to 'active'. At this time, since the second operating system is being executed before the input of the user is received, the status bar of the first operating system may be set to 'inactive', and the state bar of the second operating system may be set to 'active'.

For example, when the user selects the status bar of the first operating system, the processor 120 may change the status bar of the first operating system from 'inactive' to 'active', and may change the status bar of the second operating system from 'active' to 'inactive'. Alternatively, when the user selects the status bar of the second operating system, the processor 120 may change the status bar of the first operating system from 'inactive' to 'active', and may change the status bar of the second operating system from 'active' to 'inactive'.

In operation 907, the processor 120 may determine that the situation information of the electronic device 101 corresponds to the reception of a power-on event from an external electronic device. The external electronic device may be an electronic device that is functionally connected to the electronic device 101. For example, when the electronic device 101 is a wearable device such as a watch, the external electronic device may be a smart phone. In this case, the external electronic device may be paired with the electronic device 101. The external electronic device may transmit the power-off event to the electronic device 101 in order to use the electronic device 101 based on the state of the electronic device 101 or an internal process thereof after being paired with the electronic device. For example, the power-on event corresponds to at least one of executing an application associated with the electronic device 101 by the external electronic device, or transmitting a signal (e.g., an awake signal) to the electronic device 101 by the external electronic device when an incoming call arrives on the external electronic device.

At this time, the processor 120 may display a user interface similar to that illustrated in FIG. 7C. The user interface may include notification information on the power-on event (A request for executing the second operating system has been made. Do you want to execute the first operating system?), and may set the status bar of the first operating system to 'inactive'. In this case, since the second operating system is being executed before the power-on event is received, the status bar of the first operating system may be set to 'inactive'. When the user selects the status bar, the processor 120 may change the status bar from an 'inactive' state to an 'active' state. When the user does not select the status bar, the processor 120 may maintain the status bar in the 'inactive' state.

In operation 911, the processor 120 may delete a set value for executing the second operating system. The set value may be stored in a specified area of the memory, and the specified area may be a magic code. For example, when the set value is stored in the magic code, the second operating system may be driven, and when the set value is not stored in the magic code, the first operating system may be driven. Thus, the processor 120 may delete the set value for executing the first operating system.

In operation 913, the processor 120 may initiate a system reboot. The system reboot is to initialize the electronic device 101, and may be done for switching the operating system from the second operating system to the first operating system. When the system is rebooted, a boot loader may be executed.

In operation 915, the processor 120 may determine whether the snapshot image is stored. When the boot loader is executed after the system reboot, the boot loader may determine whether the set value is stored in the magic code. When the set value is not stored in the magic code, the boot loader may perform an operation required to properly boot up the electronic device 400, and may be terminated after executing the kernel. The snapshot image may be stored in the first memory 430. When the kernel is executed, the kernel may determine whether the snapshot image is stored in the first memory 430. When the snapshot image is stored in the first memory, the processor may perform an operation 917, and when the snapshot image is not stored therein, the processor may perform an operation 921.

In operation 917, the processor 120 may perform an operation of a hibernation swap-in. The hibernation swap-in may refer, for example, to an operation of recovering a snapshot image stored in the first memory 430 to the second memory 440. According to various embodiments, the processor 120 may load the snapshot image to the second memory 440 as at least a part of the re-execution operation (e.g., operations 903, 905, and 907). That is, the kernel may swap the first memory 430 and load the snapshot image stored in the first memory 430 to the second memory 440 while performing the device initialization. The second memory 440 is a volatile memory, and may be used when the electronic device 101 performs a general operation. As described above, the second memory 440 may temporarily store data processed by the electronic device 101 while being driven by the first operating system, and may not be driven when the electronic device 101 is switched to the second operating system. Therefore, the second memory 440 is not driven when the electronic device 101 enters into a sleep state.

In operation 919, the processor 120 may drive the first operating system. As described above, the snapshot image is stored for rapid recovery to a time point before the electronic device 101 executes the second operating system, and when the snapshot image has been stored, the kernel may be rapidly booted by using the snapshot image. When the operation of the kernel is completed, the first operating system may be executed. The processor 120 may be configured to recover the first operating system to an execution state corresponding to the snapshot image, as at least some of the re-execution operations. That is, the processor 120 may be recovered to a previous state without performing all of the general boot processes.

In operation 921, the processor 120 may perform a general boot process. For example, when the snapshot image is not stored in the first memory 430, the kernel may perform a general operation required for a cold boot and be terminated. The cold boot refers to performing of a general boot process which initializes all of the devices and settings, such as switching on the power supply of the electronic device 400. The kernel may read a file system, activate the first memory 430 and second memory 440, initialize the system, and then may be terminated. When the system initialization is completed, the first operating system is executed so that an application may be started and the process may be initialized.

Figure 10:
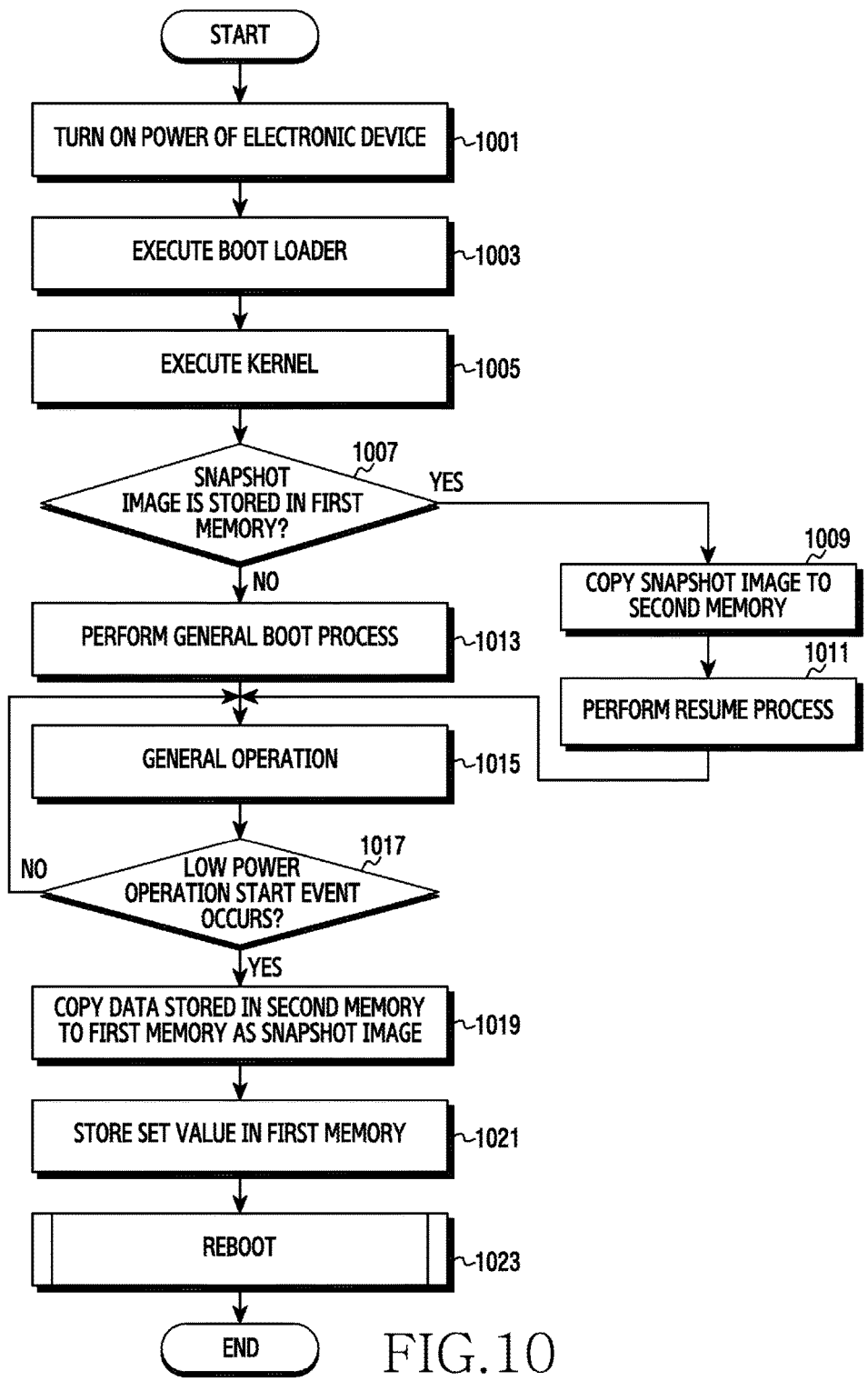
FIG. 10 is a flowchart illustrating an example method for booting an electronic device according to various example embodiments.

FIG. 10 is a flowchart illustrating an example boot method for an electronic device according to various example embodiments.

Referring to FIG. 10, in operation 1001, the electronic device 101 (e.g., the processor 120) may turn on the power. For example, when the power button provided on the electronic device 101 is pressed and the charger is connected to the electronic device 101, the power of the electronic device 101 may be turned on.

Hereinafter, operation 1003 to operation 1007 are operations performed during a cold boot, and a detailed description as a part of the general boot process may be omitted.

In operation 1003, a boot loader of the electronic device 101 may be executed. The boot loader may be a program performed prior to the operating system, and the program may include operations of performing a task required to properly boot up the electronic device 400, and controlling such that the kernel is to be executed, and terminating the procedure. The boot loader may load an image (e.g., a boot loader image), and perform board initialization and configuration. The boot loader may load the kernel to the second memory 440.

In operation 1005, a kernel of the electronic device 101 may be executed. When the kernel is loaded to the second memory 440, the kernel may be initialized, load a device drive and initialize the same, and activate the first memory 430 and second memory 440. At this time, the kernel may check whether the snapshot image is stored in the first memory 430.

In operation 1007, the kernel may check whether the snapshot image is stored in the first memory 430. When the snapshot image is stored therein, the processor may perform an operation 1009, and when the snapshot image is not stored therein, the processor may perform an operation 1013.

In operation 1009, the kernel may copy the snapshot image to the second memory 440. The operations 1009 may correspond to a hibernation swap-in operation. The kernel may swap the first memory 430 and load the snapshot image stored in the first memory 430 to the second memory 440 while performing the device initialization. The second memory 440 is a volatile memory, and may be used when the electronic device 101 performs a general operation. As described above, the second memory 440 may temporarily store data processed by the electronic device 101 while the first operating system is driven, and the second memory 440 may not be driven when the electronic device 101 is switched to the second operating system.

In operation 1011, the kernel may perform a resume process. The resume process may be an operation for the rapidly recovery to a time point before the electronic device 101 executes the second operating system. When the snapshot image is stored, the kernel may be rapidly booted by using the snapshot image. When the operation of the kernel is completed, the first operating system may be executed. In this case, the processor 120 may be configured to recover the first operating system to an execution state corresponding to the snapshot image, as at least some of the re-execution operations. When the operation 1011 is completed, the kernel may perform an operation 1015.

In operation 1013, the kernel may perform a general process. For example, when the snapshot image is not stored in the first memory 430, the kernel may perform a general operation required for the cold boot and be terminated. The cold boot refers to performing a general booting process which initializes all of the devices and settings, such as switching on the power supply of the electronic device 400. The kernel may read a file system, activate the first memory 430 and second memory 440, initialize the system, and then may be terminated. When the system initialization is completed, the first operating system is executed so that an application may be started and the process may be initialized.

In operation 1015, the processor 120 may perform a general operation. The general operation is a state where the first operating system is being driven, and may correspond to a general mode of the electronic device 101. In the general mode, it is possible to support an existing platform, drive various applications, and use most built-in hardware of the electronic device 400. The first operating system may include, for example, a multitasking kernel operating system (OS) such as Linux, Unix, Windows, etc., and a platform OS that operates thereon, such as Android, Tizen, Window platform, etc.

In operation 1017, the processor 120 may determine whether a low-power operation start event occurs. The low-power operation start event may include at least one of a case where the battery level of the electronic device 101 is less than the reference value, a case where a user input for executing the second operating system is received, or a case where a power-off event is received from an external electronic device. The processor 120 may perform an operation 1019 when the low-power operation start event is detected, and may return to the operation 1015 when the low-power operation start event is not detected. In other words, the processor 120 may perform a general operation when the low-power event is not detected.

In operation 1019, the processor 120 may copy, to the first memory 430, data stored in the second memory 440 as a snapshot image. The operation 1019 may correspond to a hibernation-swap-out operation. The snapshot image may include execution state information of the first operating system. The processor 120 may back up data of the second memory 440 to the first memory 430 by using a swap-out method.

In operation 1021, the processor 120 may store a set value in the first memory 430. The set value is for the execution of the second operating system, and may be stored in a specific area of the memory (e.g., a magic code). For example, when the set value is stored in the magic code, the second operating system may be driven, and when the set value is not stored in the magic code, the first operating system may be driven. Thus, the processor 120 may store the set value for the drive of the second operating system.

In operation 1023, the processor 120 may re-boot the electronic device 101. The reboot is to initialize the electronic device 101, and may be done for switching of the operating system from the first operating system to the second operating system. When the system is rebooted, a boot loader may be executed.

Figure 11:
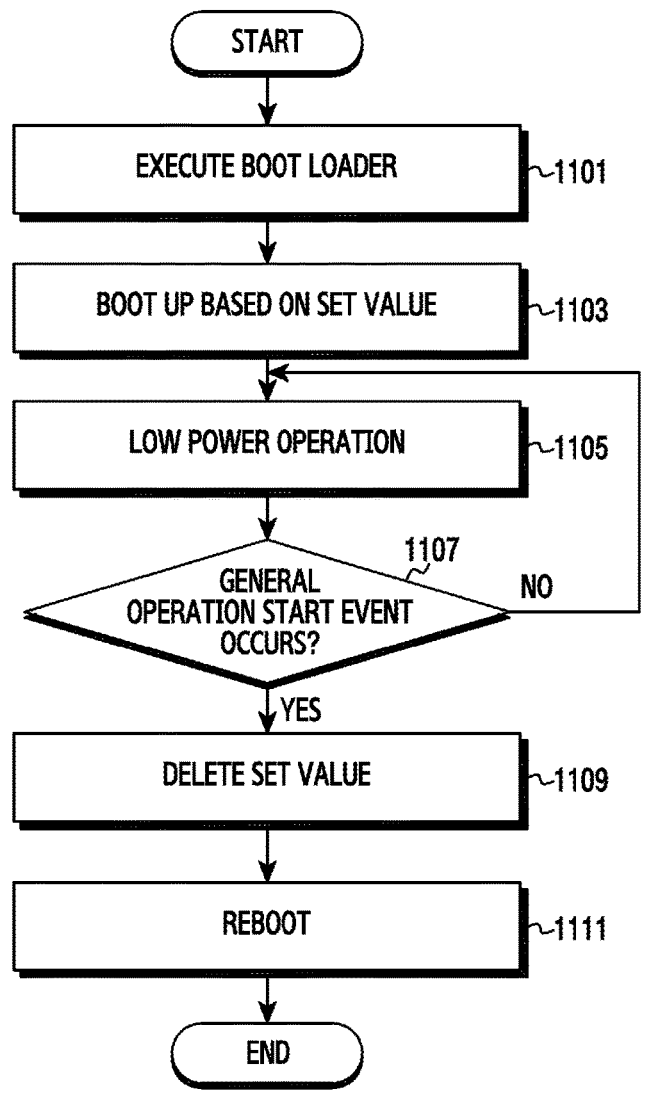
FIG. 11 is a flowchart illustrating an example method for operating an electronic device in a low power mode according to various example embodiments.

FIG. 11 is a flowchart illustrating an example low-power operation method for an electronic device according to various example embodiments.

FIG. 11 illustrates operations to be processed after performing the operation 1023 of FIG. 10.

Referring to FIG. 11, in operation 1101, a boot loader of the electronic device 101 may be executed. When the boot loader is executed after a system reboot, the boot loader may determine whether the set value is stored in the magic code.

In operation 1103, the boot loader may be booted based on the set value. For example, when the set value is stored in the magic code, the boot loader itself may be operated as the second operating system without executing the kernel.

In operation 1105, the boot loader may perform a low-power operation. The low-power operation may be a mode for performing the minimum and/or reduced function according to the purpose (or characteristics) of the electronic device 101. For example, the boot loader may drive a restricted application, and may use restricted hardware from built-in hardware of the electronic device 400. The boot loader may initialize necessary components, and perform necessary functions (e.g., clock and sensing) for each specific time according to the purpose of the electronic device 101.

According to various embodiments, the boot loader may change a clock frequency at which the processor 120 operates to a predetermined clock frequency. According to various embodiments, the boot loader may change at least a part of configuration information associated with the display 160. According to various embodiments, the boot loader may output notification information corresponding to at least one function through the display 160 or speaker (e.g., speaker 282) functionally connected to the electronic device 101 at least partially based on the execution of the second operating system in the second memory 440. According to various embodiments, the boot loader may transmit information acquired through the input/output interface 150 or the sensor module 240 to the external electronic device (e.g., the electronic devices 102 and 104) through the communication interface 170 at least partially based on the execution of the second operating system in the second memory 440.

In operation 1107, the boot loader may determine whether a general operation start event occurs. The general operation start event may include at least one of a case where the battery level of the electronic device 101 exceeds a set value, a case where a user input for executing the first operating system is received, or a case where a power-off event is received from an external electronic device. Alternatively, the general operation start event may include a case where the charger is connected to the electronic device 101.

The boot loader may perform an operation 1109 when the general operation start event is detected, and may return to the operation 1105 when the general operation start event is not detected. That is, the boot loader may perform a low-power operation when the general operation start event is not detected.

In operation 1109, the boot loader may delete the set value. The set value may be used to boot up the electronic device by the second operating system. Accordingly, the electronic device 101 may delete the set value in the magic code such that the electronic device 101 is not booted by the second operating system. Alternatively, in operation 1103, the boot loader may delete the set value when the boot is completed based on the set value.

In operation 1111, the boot loader may be rebooted. When the reboot is performed, the electronic device 101 may perform the operation 1003 of FIG. 10 so as to execute the boot loader. When the boot loader is executed, it may be determined that the set value is stored in the magic code. When the set value is not stored in the magic code, the boot loader may perform an operation required to properly boot up the electronic device 400, and control such that the kernel is executed and then end the procedure. In this case, the operations 1005 to 1023 of FIG. 10 may be performed.

A method of operating an electronic device according to various example embodiments may include: checking situation information associated with the electronic device at least partially based on the execution of the first operating system; when the situation information satisfies a predetermined condition, storing, in the first memory, as a snapshot image, data associated with the execution of the first operating system and stored in the second memory; and controlling that the electronic device to execute the second operating system in the second memory.

In an embodiment, the checking of the situation information may include: detecting, as at least a part of the situation information, an input, a battery state of the electronic device, a power-off event, an input from an external electronic device, or a combination thereof.

In an embodiment, the snapshot image may include execution state information of the first operating system.

In an embodiment, the controlling operation may change a clock frequency at which the processor operates to a predetermined clock frequency at least partially based on the execution of the second operating system.

In an embodiment, the controlling operation may include: changing at least a part of configuration information relating to the display functionally connected to the electronic device at least partially based on the execution of the second operating system.

In an embodiment, the method may further include: outputting notification information corresponding to at least one function through a display and/or a speaker functionally connected to the electronic device at least partially based on the execution of the second operating system in the second memory.

In an embodiment, the notification information may include outputting time information, information received from an external electronic device through a communication module functionally connected to the electronic device, information detected through a sensor module functionally connected to the electronic device, or a combination thereof.

In an embodiment, the method may further include: transmitting, to the external electronic device, information acquired through the input circuitry of the input module or the sensor module of the electronic device through the communication circuitry of the communication module at least partially based on the execution of the second operating system in the second memory.

In an embodiment, the method may further include: checking whether the situation information satisfies another predetermined condition at least partially based on the execution of the second operating system; and controlling the electronic device to re-execute the first operating system in the second memory by using at least a part of the snapshot image, at least partially based on the checking.

According to various example embodiments, a computer-readable recording medium in which a program executing operations is recorded may be provided, the operations including: checking situation information associated with the electronic device at least partially based on the execution of the first operating system; when the situation information satisfies a predetermined condition, storing, in the first memory, as a snapshot image, data which is associated with the execution of the first operating system and stored in the second memory; and executing the second operating system in the second memory.

A computer-readable recording media can include a hard disk, a floppy disk, a magnetic media (e.g., a magnetic tape), an optical media (e.g., a Compact Disc—Read Only Memory (CD-ROM) and/or Digital Versatile Disk (DVD)), a Magneto-Optical Media (e.g., a floptical disk), an internal memory, etc. An instruction can include a code made by a compiler or a code executable by an interpreter. A module or a program module according to various example embodiments can further include at least one or more of the aforementioned constituent elements, or omit some, or further include another constituent element. Operations carried out by a module, a program module or another constituent element according to various example embodiments can be executed in a sequential, parallel, repeated or heuristic method, or at least some operations can be executed in different order or can be omitted, or another operation can be added.

The various example embodiments disclosed in the present disclosure and drawings are simply examples provided to aid in explanation of the technical features and aid in understanding, and are not intended to limit the scope of the present disclosure. Therefore, the scope of the present disclosure is defined not by the detailed description but by the appended claims, and all differences within the scope will be construed as being included in the present disclosure.

What is claimed is:

1. An electronic device comprising:
a rechargeable battery;
a first memory configured to store a first operating system used in a normal power state and a second operating system used in a low power state, the first memory being non-volatile memory;
a second memory, the second memory being volatile memory; and
a processor,
wherein the processor is configured to:
identify, while executing the first operation system, remaining capacity of the rechargeable battery is less than reference capacity,
in response to identifying that the remaining capacity is less than the reference capacity, store data that is stored in the second memory while executing the first operating system to the first memory and switch the executing first operating system to a second operating system, and
in response to identifying that the remaining capacity is greater than or equal to another reference capacity while executing the second operating system, restore a state of the first operating system as a state immediately before the switching to the second operating system, by switching the second operating system to the first operating system and executing the first operating system based on the data stored in the first memory.

2. The electronic device of claim 1, wherein the data is stored in the first memory as a snapshot image.

3. The electronic device of claim 1, wherein the processor is further configured to
execute the second operating system at a second clock frequency that is lower than a first clock frequency at which the first operating system is executed.

4. The electronic device of claim 1, further comprising a display, and
wherein the processor is further configured to:
adjust the brightness of the display as the second brightness, while the second operating system is being executed, lower than the first brightness of the display when the first operating system is being executed.

5. The electronic device of claim 1, further comprising a display, and wherein, the processor is further configured to:
display, through the display, notification information representing the remaining capacity when the remaining capacity is less than the reference capacity.

6. The electronic device of claim 5, wherein, the processor is further configured to:
store the data that is stored in the second memory while executing the first operating system to the first memory and switch the executing first operating system to a second operating system after the notification information is displayed.

7. The electronic device of claim 1, wherein, the processor is further configured to:
while initiating the electronic device, identify a set value that is stored in a designated area of the first memory; and
in response to identifying that the set value is a first set value for executing the first operating system, execute the first operating system.

8. The electronic device of claim 7, wherein the processor is configured to:
in response to identifying that the set value is a second set value for executing the second operating system, execute the second operating system.

9. The electronic device of claim 7, wherein the processor is configured to:
in response to identifying that the set value is the first set value for executing the first operating system, identify that data indicating a state of the first operating system immediately before the switching to the second operating system is stored in the first memory; and
in response to identifying that the data indicating the state is stored in the first memory, restore the state of the first operating system immediately before the switching to the second operating system, based on the data indicating the state stored in the first memory.

10. The electronic device of claim 9, wherein the processor is configured to:
in response to identifying that the data indicating the state is not stored in the first memory, boot the first operating system as cold boot.

11. A method of operating an electronic device, the method comprising:
identifying, while executing a first operation system used in a normal power state, remaining capacity of a rechargeable battery is less than reference capacity;
in response to identifying that the remaining capacity is less than the reference capacity, storing data that is stored in a second memory while executing the first operating system to a first memory and switching the executing first operating system to a second operating system used in a low power state; and
in response to identifying that the remaining capacity is greater than or equal to another reference capacity while executing the second operating system, restoring a state of the first operating system as a state immediately before the switching to the second operating system, by switching the second operating system to the first operating system and executing the first operating system based on the data stored in the first memory, and
wherein the first memory is a non-volatile memory; and wherein the second memory is a volatile memory.

12. The method of claim 11, wherein the data is stored in the first memory as a snapshot image.

13. The method of claim 11, the method further comprising:
executing the second operating system at a second clock frequency that is lower than a first clock frequency at which the first operating system is executed.

14. The method of claim 11, the method further comprising:
adjusting the brightness of a display as the second brightness, while the second operating system is being executed, lower than the first brightness of the display when the first operating system is being executed.

15. The method of claim 11, the method further comprising:
displaying notification information representing the remaining capacity when the remaining capacity is less than the reference capacity.

16. The method of claim 15, the method further comprising:
storing the data that is stored in the second memory while executing the first operating system to the first memory and switching the executing first operating system to a second operating system after the notification information is displayed.

17. The method of claim 11, the method further comprising:
while initiating the electronic device, identifying a set value that is stored in a designated area of the first memory; and
in response to identifying that the set value is a first set value for executing the first operating system, executing the first operating system.

18. The method of claim 17, the method further comprising:
in response to identifying that the set value is a second set value for executing the second operating system, executing the second operating system.

* * * * *